United States Patent
Hu et al.

(10) Patent No.: US 8,856,299 B2
(45) Date of Patent: Oct. 7, 2014

(54) POLICY AND CHARGING RULES FUNCTION MANAGEMENT METHOD, MANAGEMENT NETWORK ELEMENT, AND NETWORK SYSTEM

(75) Inventors: Ying Hu, Shenzhou (CN); Yu Yin, Shenzhen (CN); Shanshan Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 459 days.

(21) Appl. No.: 12/778,325

(22) Filed: May 12, 2010

(65) Prior Publication Data

US 2010/0235519 A1    Sep. 16, 2010

Related U.S. Application Data

(63) Continuation of application No. PCT/CN2009/070294, filed on Jan. 23, 2009.

(30) Foreign Application Priority Data

Jan. 28, 2008 (CN) .......................... 2008 1 0006995

(51) Int. Cl.
     *G06F 15/16*      (2006.01)
     *H04L 12/24*      (2006.01)
     *H04L 12/14*      (2006.01)
     *H04M 15/00*      (2006.01)

(52) U.S. Cl.
     CPC ........ *H04L 41/5041* (2013.01); *H04L 41/0893* (2013.01); *H04L 12/1457* (2013.01); *H04L 12/14* (2013.01); *H04M 15/64* (2013.01)
     USPC ........... 709/223; 709/224; 709/226; 709/227; 725/1; 725/6; 725/7

(58) Field of Classification Search
     CPC . H04L 12/14; H04L 12/1403; H04L 12/1457; H04L 12/1467; H04L 12/5695; H04L 63/20; H04L 41/0806; H04L 41/0896; H04L 41/0893; H04L 41/5041; H04L 67/327; H04L 67/14; H04M 15/66; H04M 15/64; H04M 15/00; H04W 4/24
     USPC ............... 709/227, 223, 224, 226; 725/1, 6, 7
     See application file for complete search history.

(56) References Cited

U.S. PATENT DOCUMENTS

7,953,884 B2 *   5/2011   Agarwal et al. ................ 709/235
8,656,449 B1 *   2/2014   Breau et al. ........................ 726/1

(Continued)

FOREIGN PATENT DOCUMENTS

CN      1612538 A      5/2005
CN      1695391 A      11/2005

(Continued)

OTHER PUBLICATIONS

"CR for Information Storage in DRA" 3 GPP TSG-SA WGS Meeting. Mariana Del Rey, USA Jan. 18, 2008.

(Continued)

*Primary Examiner* — Alina N Boutah
(74) *Attorney, Agent, or Firm* — Brinks Gilson & Lione

(57) ABSTRACT

A Policy and Charging Rules Function (PCRF) management method includes: acquiring information about a policy control session corresponding to a data connection, where the information about the policy control session includes information about policy control session release or result information about policy control session setup, and managing a mapping relation between the data connection and a PCRF according to the information about the policy control session corresponding to the data connection. A management network element includes: a policy control session information acquiring unit, adapted to acquire the information about a policy control session corresponding to a data connection, where the information about the policy control session includes information about policy control session release or result information about policy control session setup; and a managing unit, adapted to manage a mapping relation between the data connection and a PCRF according to the information about the policy control session corresponding to the data connection.

14 Claims, 11 Drawing Sheets

(56) References Cited

U.S. PATENT DOCUMENTS

| | | | |
|---|---|---|---|
| 2007/0064710 A1* | 3/2007 | Holmstrom et al. | 370/395.2 |
| 2007/0066286 A1* | 3/2007 | Hurtta | 455/414.1 |
| 2008/0002686 A1* | 1/2008 | Valli et al. | 370/389 |
| 2008/0046963 A1* | 2/2008 | Grayson et al. | 726/1 |
| 2008/0052258 A1* | 2/2008 | Wang et al. | 706/46 |
| 2008/0159257 A1* | 7/2008 | Alfano et al. | 370/349 |
| 2008/0229385 A1* | 9/2008 | Feder et al. | 726/1 |
| 2008/0256237 A1* | 10/2008 | Liu | 709/226 |
| 2009/0010271 A1* | 1/2009 | Bachmann et al. | 370/401 |
| 2009/0168696 A1* | 7/2009 | Lindstrom et al. | 370/328 |
| 2010/0154029 A1* | 6/2010 | Fernandez Alonso et al. | 726/1 |
| 2010/0165902 A1* | 7/2010 | Kvernvik et al. | 370/312 |
| 2010/0182912 A1* | 7/2010 | Hongisto et al. | 370/242 |
| 2010/0211666 A1* | 8/2010 | Kvernvik et al. | 709/223 |
| 2010/0217877 A1* | 8/2010 | Willars et al. | 709/228 |
| 2010/0257582 A1* | 10/2010 | Castellanos Zamora et al. | 726/1 |
| 2011/0222399 A1* | 9/2011 | Shi et al. | 370/230 |
| 2011/0244865 A1* | 10/2011 | Wu et al. | 455/436 |
| 2014/0064074 A1* | 3/2014 | Huang et al. | 370/230 |

FOREIGN PATENT DOCUMENTS

| | | | |
|---|---|---|---|
| CN | 1832449 A | | 9/2006 |
| CN | 1889499 A | | 1/2007 |
| CN | 101035145 A | | 9/2007 |
| CN | 101399699 A | | 4/2009 |
| EP | 1724965 A1 | * | 11/2006 |
| WO | 2004/029854 A2 | | 4/2004 |

OTHER PUBLICATIONS

"Proposal for How to Progress Work on PCRF Discovery in Cooperation with CT Groups." 3 GPP TSG-SA WGS Meeting. Mariana Del Rey, USA Jan. 18, 2008.

"$3^{rd}$ Generation Partnership Project; Technical Specification Group Services and System Aspects; Policy and Charging Control Architecture (Release 8)" 3GPP. Dec. 2007.

"Digital Cellular Telecommunications System (Phase 2+); Universal Mobile Telecommunications System (UMTS); Policy and Charging Control Signalling Flows and Quality Service (QoS) Parameter Mapping (3GPP TS 29.213 version 7.3.1 Release 7)" 3GPP. Jan. 2008.

$3^{rd}$ Generation Partnership Project; Technical Specification Group Core Network and Terminals; Policy and Charging Control Signalling Flows and QoS Parameter Mapping; (Release 8). Oct. 2008.

Written Opinion of the International Searching Authority issued in corresponding PCT/CN2009/070294; mailed Apr. 30, 2009.

Office Action issued in corresponding Chinese Patent Application No. 2008100069957; mailed Oct. 23, 2009.

Supplementary European Search Report issued in corresponding European Patent Application No. 09 70 5091; Sep. 1, 2010.

International Search Report issued in corresponding PCT Application No. PCT/CN2009/070294; mailed Apr. 30, 2009.

Office Action issued in corresponding Japanese Patent Application No. 2010-530265, mailed Jan. 24, 2012.

Office Action issued in corresponding Chinese Patent Application No. 200810006995.7, mailed Nov. 2, 2011.

Office Action issued in corresponding Japanese Patent Application No. JP 2010-530265, mailed Oct. 4, 2011.

GSM, "$3^{rd}$ Generation Partnership Project: Technical Specification Group Services and System Aspects; Policy and Charging Control Architecture" (Release 8), 3GPP TS 23.203, V8.0.0. Dec. 2007.

* cited by examiner

POLICY AND CHARGING RULES FUNCTION MANAGEMENT METHOD, MANAGEMENT NETWORK ELEMENT, AND NETWORK SYSTEM

CROSS-REFERENCE TO RELATED APPLICATIONS

This application is a continuation of International Application No. PCT/CN2009/070294, filed on Jan. 23, 2009, which claims priority to Chinese Patent Application No. 200810006995.7, filed on Jan. 28, 2008, both of which are hereby incorporated by reference in their entireties.

FIELD OF THE DISCLOSURE

The present disclosure relates to communication technologies, and in particular to a Policy and Charging Rules Function (PCRF) management method, a management network element, and a network system.

BACKGROUND

A network architecture with Policy and Charging Control (PCC) functions includes a Policy and Charging Rules Function (PCRF), a Policy and Charging Enforcement Function (PCEF), and an Application Function (AF), as shown in FIG. 1. The PCRF is adapted to dynamically generate a Quality of Service (QoS) and charging rule ("PCC rule") for a user service stream according to an operation policy and service application information. The PCEF is a gateway that executes the PCC rule. The AF is generally a service control server. A user terminal needs to access the AF to initiate a service connection. The AF provides terminal service information for the PCRF. The PCRF communicates with the PCEF/AF through a Diameter protocol. The PCEF/AF is a client, and the PCRF is a server.

Multiple PCRFs may be deployed in a PCC network. When a user terminal is connected to a data network, one of the PCRFs may be selected. After a PCRF is selected, the selected PCRF serves as the PCC server of the data connection till the data connection to the data network is disconnected. Multiple clients in a network need to access the PCRF for the same data connection. Therefore, a PCRF management entity is introduced into the PCC network to manage the mapping relation between the data connection and the PCRF that serves the data connection, where the data connection exists between the user and the data network. If any the policy control request message sent by the clients does not carry destination PCRF information, the policy control request message needs to pass through the PCRF management entity. The PCRF management entity acquires the destination PCRF information according to the prestored mapping relation between the data connection and the PCRF that serves the data connection, and sends the policy control request message to the destination PCRF, thus ensuring that different clients use the same PCRF as the PCC server when the different clients request for allocating a server for the same data connection.

When a client sets up a connection with the PCC server for the first time, the PCRF management entity needs to select an available PCC server and return information about the selected PCC server to the client, and record the mapping relation between the data connection and the PCC server. The client sends a policy control request message to the available PCC server, instructing the PCC server to set up a data connection. In fact, the route between the client and the allocated PCC server may be blocked, which leads to failure of setting up the data connection between the client and the allocated PCC server. When the client selects a PCC server again, the setup of the policy control session corresponding to the data connection still fails. This is because the PCRF management entity retains the mapping relation between the data connection and the PCC server that is selected previously and thus the returned information about a PCC server is still the information about the PCC server that is selected last time.

After the data connection between the client and the PCC server is set up successfully, one party can acquire the host name of the other party. Thus, the information exchanged subsequently can be routed to the peer party through host name. For example, the policy control request message subsequently sent by the client to the PCC server carries the destination PCRF information, and thus it is not necessary to query the PCRF management entity for the destination PCRF information. Therefore, when the data connection is released, the policy control request message that indicates releasing the data connection carries the destination PCRF information. This causes that the policy control request message does not pass through the PCRF management entity. After the data connection from the user to the data network is released, the PCRF management entity still retains the mapping relation between the data connection and the PCRF that serves the data connection. When the user accesses the data network again, the policy control request message that indicates setting up a data connection is sent to the PCRF management entity. The PCRF management entity returns the previously stored PCRF information corresponding to the data connection. The client uses the PCRF as a destination PCRF, and sends the policy control request message that indicates setting up a data connection. However, when the PCRF fails, it is impossible to set up the policy control session corresponding to the data connection.

After the client is connected to the PCC server for the first time, the PCRF management entity stores the mapping relation between the data connection and the PCC server that serves the data connection. During user handover, a new client needs to set up a policy control session with the previous PCC server. The prior art does not mention how a PCRF management entity handles the mapping relation between the prestored data connection and the PCC server that serves the data connection in the case that the setup of the policy control session between the new client and the PCC server fails.

SUMMARY

Embodiments of the present disclosure provide a PCRF management method, a management network element, and a network system to manage the mapping relation between a data connection and a PCRF that serves the data connection.

A PCRF management method provided in an embodiment of the present disclosure includes:

acquiring information about a policy control session corresponding to a data connection, where the information about the policy control session includes information about policy control session release or information about a result of setting up the policy control session; and managing a mapping relation between the data connection and a PCRF according to the information about the policy control session corresponding to the data connection.

A management network element provided in an embodiment of the present disclosure includes:

a policy control session information acquiring unit, adapted to acquire information about a policy control session corresponding to a data connection, where the information about the policy control session includes information about policy control session release or information about a result of setting up the policy control session; and a managing unit, adapted to manage a mapping relation between the data connection and a PCRF according to the information about the policy control session corresponding to the data connection.

A network system provided in an embodiment of the present disclosure includes:

a network node, adapted to send information about a policy control session release corresponding to a data connection to a management network element; and the management network element, adapted to receive the information about the policy control session release corresponding to the data connection from the network node, and manage a prestored mapping relation between the data connection and a PCRF that serves the data connection according to the received information about the policy control session release corresponding to the data connection.

Another network system provided in an embodiment of the present disclosure includes:

a management network element, adapted to acquire information about a PCRF available to a user, and send the information to a network node that needs to set up a policy control session corresponding to a data connection, receive information about a result of setting up the policy control session corresponding to the data connection from the network node, and manage a mapping relation between the data connection and the PCRF according to the information about the result of setting up the policy control session corresponding to the data connection; and the network node, adapted to send a request for setting up the policy control session corresponding to the data connection to the available PCRF, receive a response from the available PCRF indicating whether the policy control session corresponding to the data connection is set up successfully, and send the information about the result of setting up the policy control session corresponding to the data connection to the management network element according to the response.

Another network system provided in an embodiment of the present disclosure includes:

a management network element, adapted to acquire information about a PCRF available to a user and send the information to a network node that needs to set up a policy control session corresponding to a data connection, receive information about a result of setting up the policy control session corresponding to the data connection from the available PCRF, and manage a mapping relation between the data connection and the available PCRF according to the information about the result of setting up the policy control session corresponding to the data connection;

the network node, adapted to send a request for setting up the policy control session corresponding to the data connection to the available PCRF; and the available PCRF, adapted to receive the request for setting up the policy control session corresponding to the data connection, and send the information about the result of setting up the policy control session corresponding to the data connection to the management network element.

DETAILED DESCRIPTION

The embodiments of the present disclosure provide a PCRF management method, which includes receiving information about release of the policy control session corresponding to the data connection, and managing the prestored mapping relation between the data connection and the PCRF that serves the data connection according to the received information about release of the policy control session corresponding to the data connection. The method is executed by a management network element. The management network element may be a PCRF management entity. The information about release of the policy control session corresponding to the data connection may be information indicating whether the policy control session is released successfully, or information indicating release of the policy control session.

Figure 1:
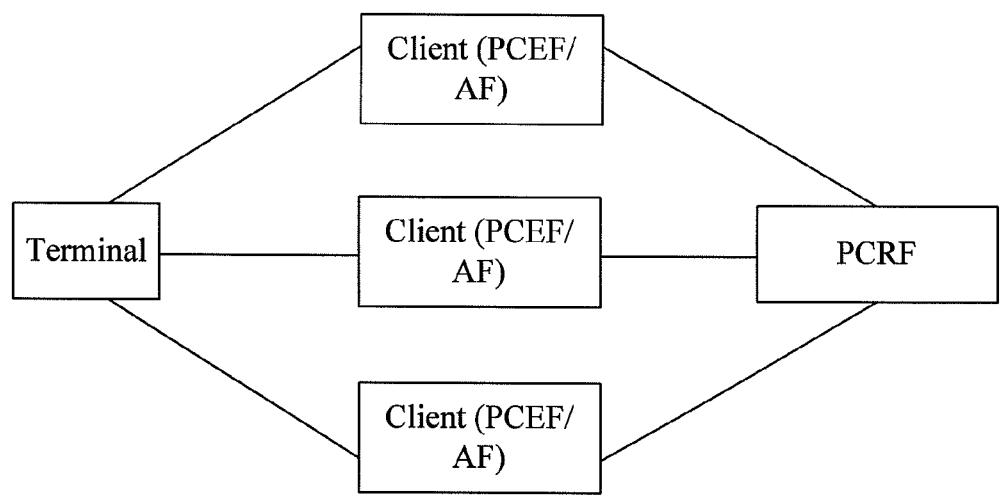
FIG. 1 shows a network architecture with PCC functions in the prior art.
Figure 2:
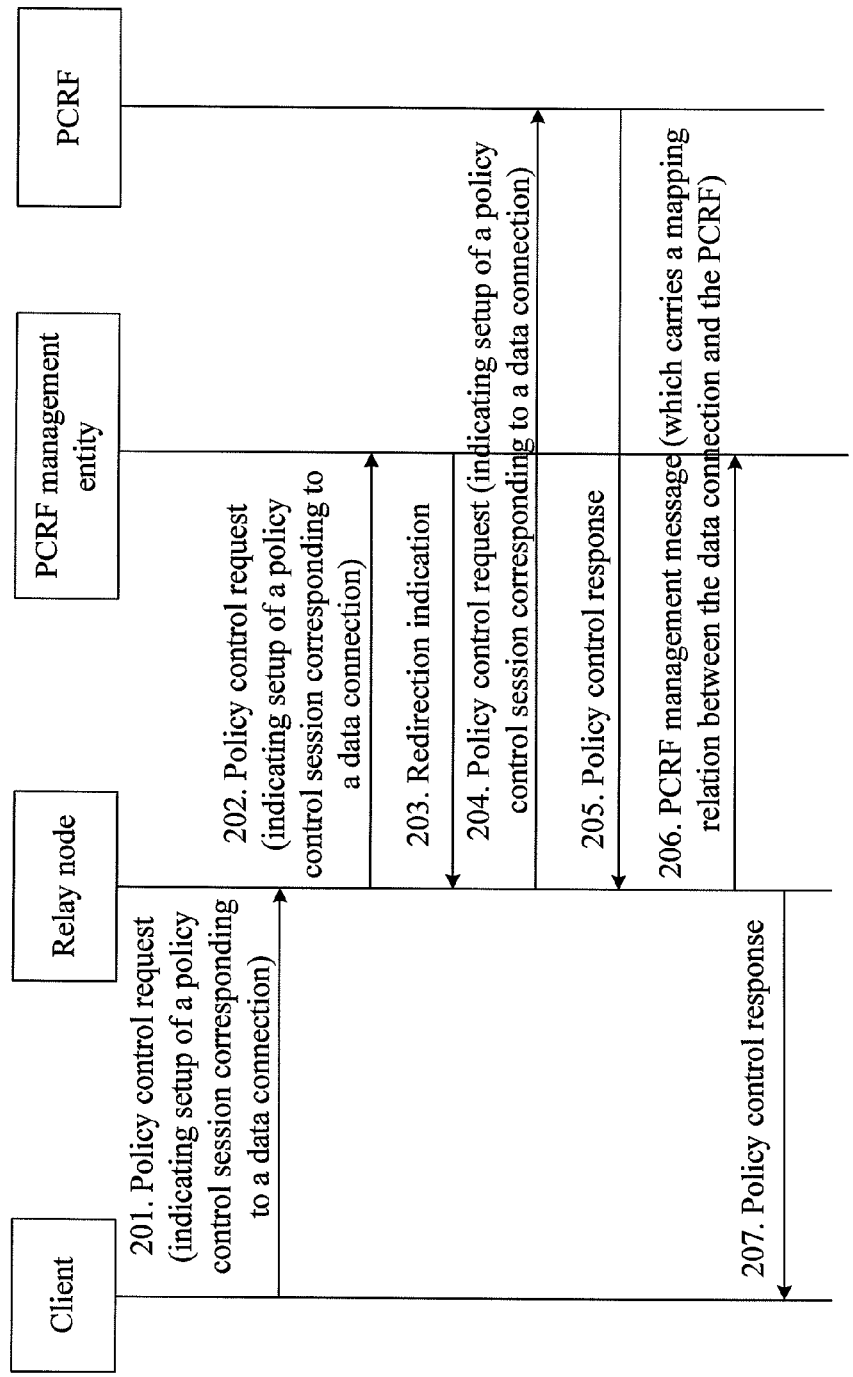
FIG. 2 is a flowchart of a PCRF management method in a first embodiment of the present disclosure.

FIG. 2 shows a PCRF management method provided in the first embodiment of the present disclosure. The method is applicable for the PCRF management entity to set up a mapping relation between the data connection and the PCRF that serves the data connection. The method includes:

Step 201: The client sends a policy control request to a relay node. The policy control request carries information indicating setup of a policy control session corresponding to the data connection between the user and the data network, user application information, and information about the data network to be accessed by the user.

Step 202: The relay node queries the Diameter routing table according to the destination domain information and the user application information in the policy control request, and knows that the node itself is a relay node, and forwards the policy control request to the next node according to the routing table information. The next node in this embodiment is a PCRF management entity.

Step 203: The PCRF management entity acquires the information about the PCRF available to the user from the Diameter routing table according to the user application information and the data network to be accessed by the user, and sends a redirection instruction to the relay node. The redirection instruction carries information about the PCRF available to the user.

The information about the PCRF available to the user may be information about one or more PCRFs.

Step 204: The relay node selects one of the available PCRFs as a destination PCRF, and sends the policy control request to the selected destination PCRF.

Step 205: The relay node receives a policy control response from the destination PCRF.

If the policy control response indicates that the policy control session corresponding to the data connection is set up successfully, the PCRF is determined as the PCRF that serves the data connection, and step 206 is executed; if the policy control response indicates that the policy control session corresponding to the data connection is set up unsuccessfully, the relay node reselects one of the available PCRFs as a destination PCRF, and steps 204-205 are repeated until a response indicating success of setting up the policy control session corresponding to the data connection is received, whereupon step 206 will be executed. If the failure type is protocol failure, the relay node may send information to the PCRF management entity, indicating failure of setting up the policy control session corresponding to the data connection with the PCRF. The PCRF management entity regards the PCRF as a temporarily faulty PCRF, and sets the PCRF as unavailable within a preset period.

Step 206: The relay node sends a PCRF management message to the PCRF management entity. The message carries information about the data connection, information about the PCRF that serves the data connection, and a mapping relation between the data connection and the PCRF that serves the data connection.

Step 207: The relay node sends a policy control response to the relay node, indicating success of setting up the data connection.

The previous steps are an initial process of setting up the data connection. Besides the initial setup of data connection, the policy control request sent by the client may carry information about the destination PCRF. If the policy control request sent by the client does not carry information about the destination PCRF, the relay node sends the policy control request to the PCRF management entity, and the PCRF management entity acquires the information about the destination PCRF according to the prestored mapping relation between the data connection and the PCRF that serves the data connection, and sends a redirection instruction that carries the destination PCRF information to the relay node. The relay node sends a policy control request to the PCRF. After receiving a policy control response that indicates success from the destination PCRF, the relay node sends a policy control response that indicates success to the client. After receiving a policy control response that indicates failure from the destination PCRF, if the failure type is protocol failure, the relay node judges whether to resend the policy control request according to the failure cause value in the policy control response that indicates failure. If the failure cause is "PCRF busy", the relay node needs to resend the policy control request to the destination PCRF. If all finally received policy control response messages indicate failure or all failure types are protocol failure, the relay node sends a policy control response that indicates failure to the client. In this case, the client or the relay node may send the information about failure of connection with the destination PCRF to the PCRF management entity. The PCRF management entity may delete the prestored mapping relation between the data connection and the destination PCRF, and wait for re-creating the mapping relation between the data connection and the PCRF that serves the data connection when the client initiates the session again.

Figure 3:
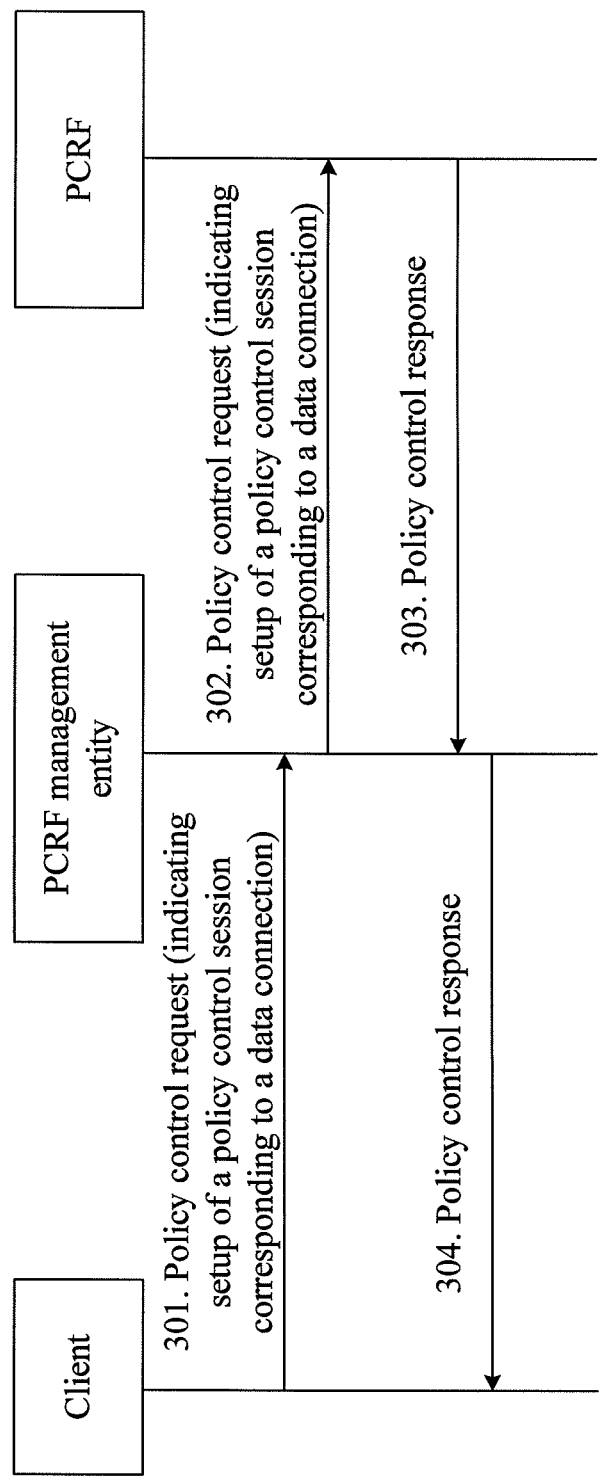
FIG. 3 is a flowchart of a PCRF management method in a second embodiment of the present disclosure.

FIG. 3 shows a PCRF management method provided in the second embodiment of the present disclosure. The method is applicable for the PCRF management entity to set up a mapping relation between the data connection and the PCRF that serves the data connection. The method includes:

Step 301: The client sends a policy control request indicating setup of a policy control session corresponding to a data connection to the PCRF management entity.

Step 302: The PCRF management entity acquires information about the available PCRF according to the destination domain information and the user application information in the policy control request, selects one of the PCRFs as a destination PCRF according to the load balance policy, and forwards the policy control request to the destination PCRF.

Step 303: The PCRF management entity receives a policy control response from the PCRF.

If the policy control response indicates success of setting up the policy control session, the foregoing PCRF is the PCRF that serves the data connection, and the mapping relation between the data connection and the PCRF that serves the data connection is set up, and step 304 is executed; if the policy control response indicates failure of setting up the policy control session, the PCRF management entity reselects one of the available PCRFs as a destination PCRF, and steps 302-303 are repeated until a policy control response indicating success of setting up the policy control session is received, whereupon the mapping relation between the data connection and the PCRF that serves the data connection will be set up, and step 304 will be executed. If the failure type is protocol failure, the PCRF management entity regards the PCRF as a temporarily faulty PCRF, and may set the PCRF as unavailable within a preset period.

Step 304: The PCRF management entity sends a policy control response to the client, indicating success of setting up the policy control session.

The foregoing steps are an initial process of setting up the policy control session. Besides the initial setup of data connection, the policy control request sent by the client may carry information about the destination PCRF. If the policy control request sent by the client does not carry information about the destination PCRF, the PCRF management entity acquires the information about the destination PCRF according to the prestored mapping relation between the data connection and the PCRF that serves the data connection, and forwards the policy control request to the destination PCRF. After receiving a policy control response that indicates success from the destination PCRF, the PCRF management entity sends a policy control response that indicates success to the client. After receiving a policy control response that indicates failure from the destination PCRF, if the failure type is protocol failure, the PCRF management entity judges whether to resend the policy control request. If the failure cause is "PCRF busy", the PCRF management entity needs to resend the policy control request to the destination PCRF. If all finally received policy control response messages indicate failure or all failure types are protocol failure, the PCRF management entity sends a policy control response that indicates failure to the client. In this case, the PCRF management entity may delete the prestored mapping relation between the data connection and the destination PCRF, and wait for re-creating the mapping relation between the data connection and the PCRF that serves the data connection when the client initiates the session again.

Figure 4:
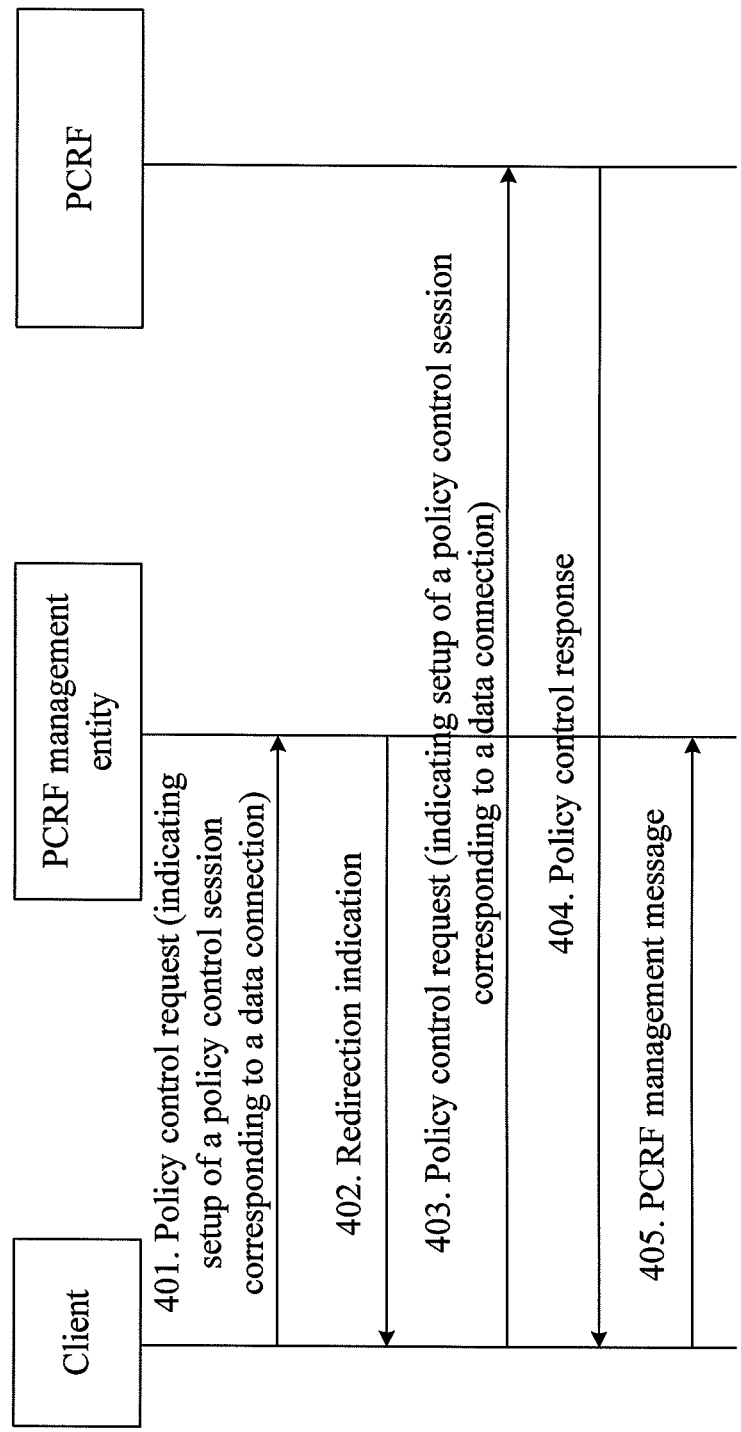
FIG. 4 is a flowchart of a PCRF management method in a third embodiment of the present disclosure.

FIG. 4 shows a PCRF management method provided in the third embodiment of the present disclosure. The method is applicable for the PCRF management entity to set up a mapping relation between the data connection and the PCRF that serves the data connection. The method includes:

Step 401: The client sends a policy control request indicating setup of a policy control session corresponding to a data connection to the PCRF management entity.

Step 402: The PCRF management entity acquires information about the available PCRF according to the destination domain information and the user application information in the policy control request, and sends a redirection instruction that carries information about the available PCRFs to the client. The information about the available PCRFs may be information about one or more PCRFs.

Step 403: The client selects one of the available PCRFs as a destination PCRF, and sends a policy control request indicating setup of a policy control session corresponding to a user data connection to the destination PCRF.

Step 404: The client receives a policy control response from the destination PCRF.

If the policy control response indicates success of setting up the policy control session, the PCRF is determined as the PCRF that serves the data connection, and step 405 is executed; if the policy control response indicates failure of setting up the policy control session, the client selects one of the available PCRFs as a destination PCRF, and steps 403-404 are repeated until a policy control response indicating success of setting up the policy control session is received, whereupon step 405 will be executed. If the policy control response indicates failure of setting up the policy control session with a PCRF, the client sends a PCRF management message to the PCRF management entity. The message carries information about failure of setting up the policy control session with the PCRF. The PCRF management entity regards the PCRF as a faulty PCRF, and sets the PCRF as unavailable within a preset period.

Step 405: The client sends a PCRF management message to the PCRF management entity. The message carries a mapping relation between the data connection and the PCRF that serves the data connection, where the data connection exists between the user and the data network.

The foregoing steps are a process of setting up a policy control session corresponding to the data connection for the first time. Besides the initial setup of data connection, the policy control request sent by the client may carry information about the destination PCRF. If the policy control request sent by the client does not carry information about the destination PCRF, the policy control request surely passes through the PCRF management entity. The PCRF management entity acquires the information about the destination PCRF according to the prestored mapping relation between the data connection and the PCRF (the data connection exists between the user and the data network), and sends the information to the client. The client sends the policy control request to the destination PCRF. After receiving a policy control response that indicates failure from the destination PCRF, the client judges whether to resend the policy control request. If the failure cause is "PCRF busy", the client needs to resend the policy control request to the destination PCRF. If all finally received policy control response messages indicate failure, the client may send the information about failure of connection with the destination PCRF to the PCRF management entity. The PCRF management entity may delete prestored mapping relation between the data connection and the destination PCRF, and wait for re-creating the mapping relation between the data connection and the PCRF that serves the data connection when the client initiates the session again.

Figure 5:
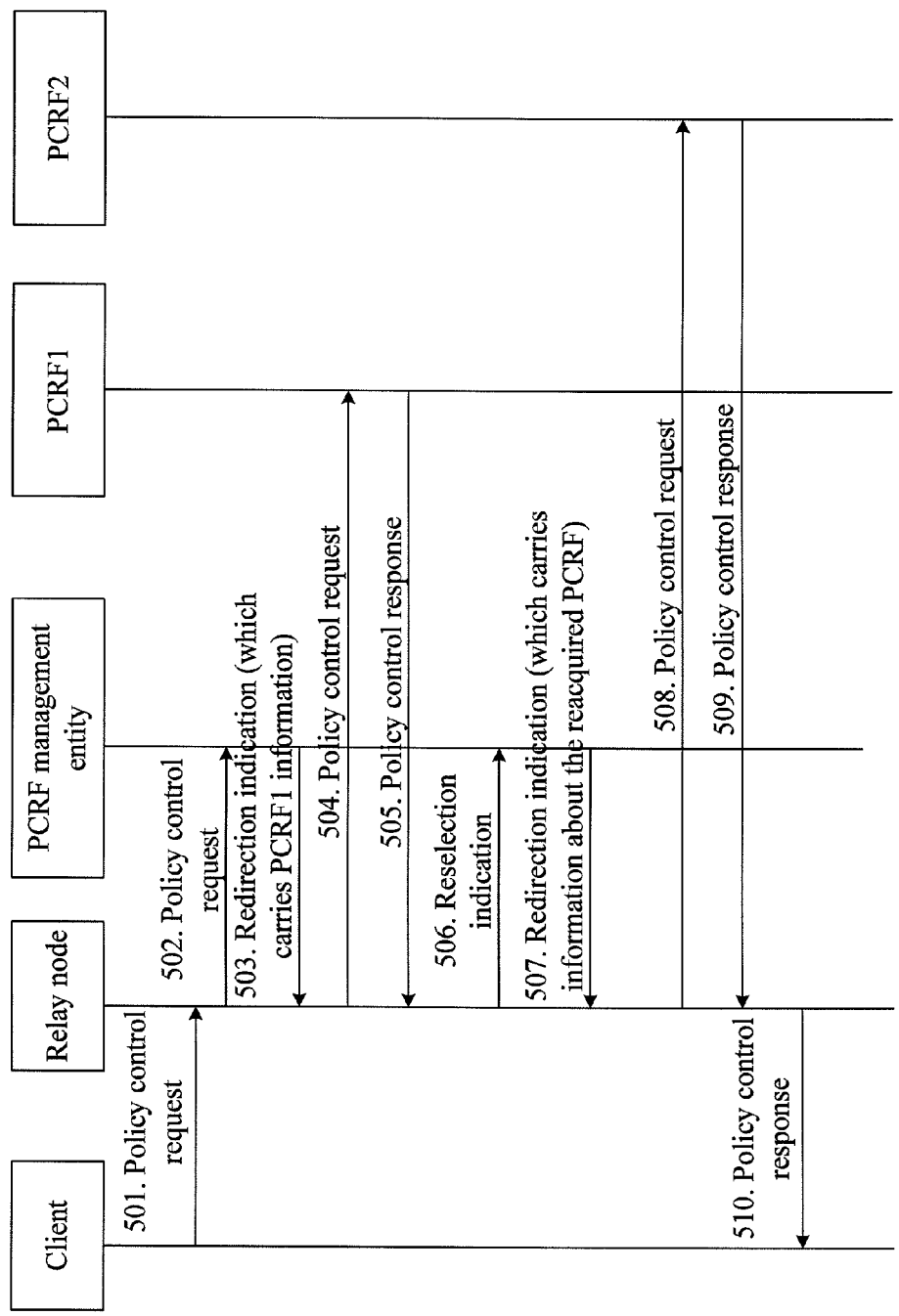
FIG. 5 is a flowchart of a PCRF management method in a fourth embodiment of the present disclosure.

FIG. 5 shows a PCRF management method provided in the fourth embodiment of the present disclosure. The method is applicable for the PCRF management entity to set up a mapping relation between the data connection and the PCRF that serves the data connection. The method includes:

Step 501: The client sends a policy control request indicating setup of a policy control session corresponding to a data connection to the relay node.

Step 502: The relay node queries the Diameter protocol routing table according to the destination domain information and the user application information in the policy control request, and knows that the node itself is a relay node, and forwards the policy control request to the next node according to the routing table information. The next node in this embodiment is a PCRF management entity.

Step 503: The PCRF management entity acquires the information about the PCRF available to the user from the Diameter routing table according to the user application information and the data network to be accessed by the user, and sends a redirection instruction to the relay node (the redirection instruction carries information about an available PCRF1) to set up a mapping relation between the data connection and the PCRF1.

Step 504: The relay node sends a policy control request indicating setup of a policy control session corresponding to a data connection to the available PCRF1.

Step 505: The PCRF1 sends a policy control response to the relay node, indicating failure of setting up the policy control session.

Step 506: The relay node sends information about a result of setting up the policy control session corresponding to the data connection to the PCRF management entity. The information about the result of setting up the policy control session indicates failure of setting up the policy control session with the PCRF1, and carries a reselection instruction.

Step 507: The PCRF management entity reacquires the information about the PCRF available to the user from the Diameter routing table according to the user application information and the data network to be accessed by the user, and sends a redirection instruction to the relay node (the redirection instruction carries information about a reacquired PCRF such as PCRF2) to set up a mapping relation between the data connection and the reacquired PCRF, and deletes the mapping relation between the data connection and the PCRF1.

Step 508: The relay node sends a policy control request indicating setup of a policy control session corresponding to a data connection to the available PCRF2.

Step 509: PCRF2 sends a policy control response to the relay node.

Step 510: If the policy control response indicates completion of setting up the policy control session, the relay node forwards the policy control response to the client; if the policy control response indicates failure of setting up the policy control session, the process goes back to step 506.

Figure 6:
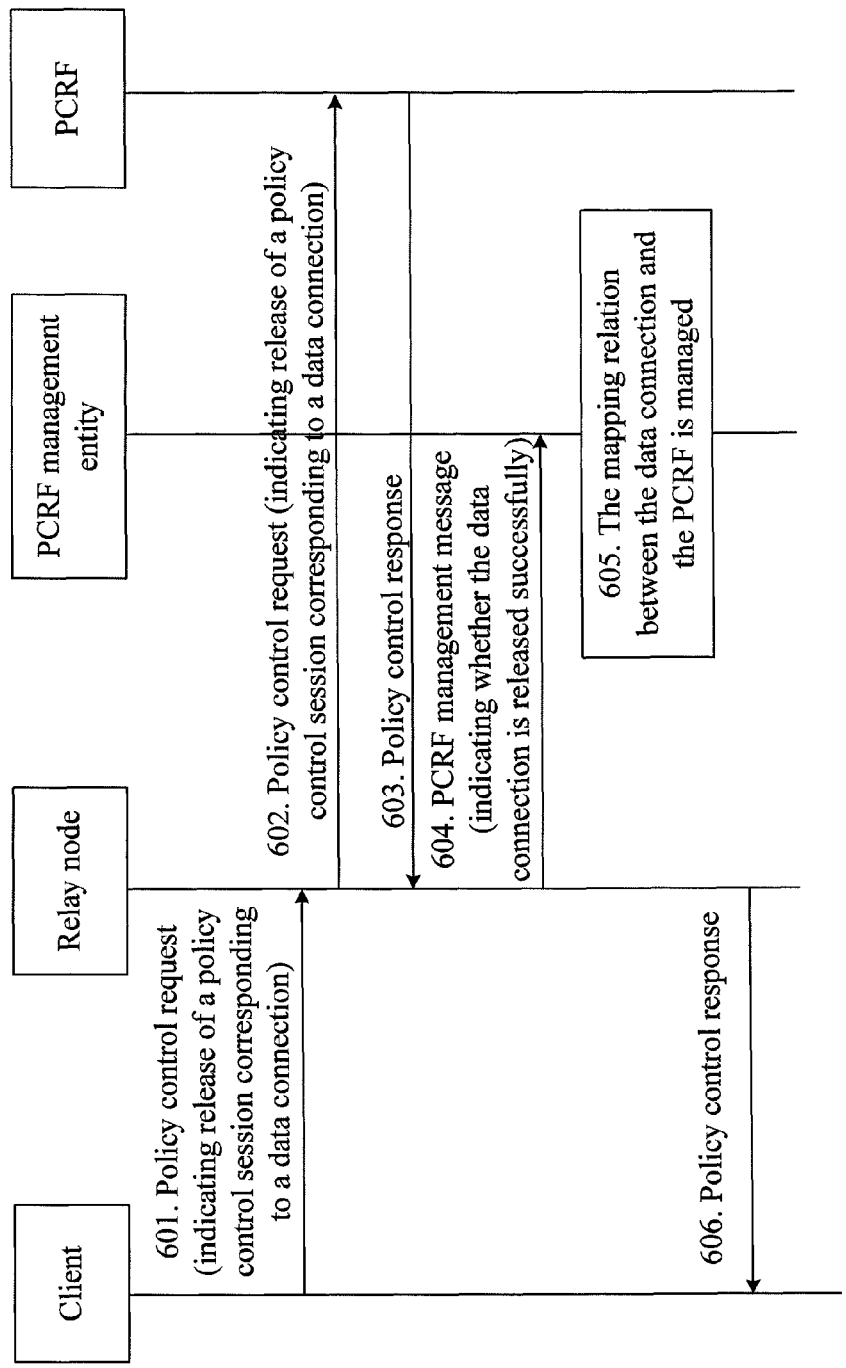
FIG. 6 is a flowchart of a PCRF management method in a fifth embodiment of the present disclosure.

FIG. 6 shows a PCRF management method provided in the fifth embodiment of the present disclosure. The method is applicable to deleting the policy control session corresponding to the data connection. The method includes:

Step 601: The client sends a policy control request indicating release of a policy control session corresponding to a data connection to the relay node.

Step 602: If the policy control request carries information about a destination PCRF, the relay node forwards the policy control request indicating release of the policy control session corresponding to the data connection to the destination PCRF.

Step 603: The destination PCRF sends a policy control response to the relay node, indicating whether the policy control session is released successfully.

Step 604: The relay node sends a PCRF management message to the PCRF management entity, indicating whether the policy control session is released successfully.

Step 605: If the PCRF management entity receives information that indicates success of releasing the policy control session, the PCRF management entity deletes the prestored mapping relation between the data connection and the PCRF that serves the data connection. If the PCRF management entity receives information that indicates failure of releasing the policy control session, the PCRF management entity keeps the prestored mapping relation between the data connection and the PCRF that serves the data connection.

Step 606: The relay node sends a policy control response to the client, indicating whether the policy control session is released successfully.

If the policy control request indicating release of the policy control session in step 601 carries no destination PCRF information, the relay node sends the policy control request indicating release of the policy control session to the PCRF management entity. The PCRF management entity acquires information about the destination PCRF according to the prestored mapping relation between the data connection and the PCRF that serves the data connection, and sends the information to the relay node. Afterward, in step 602, the relay node forwards the policy control request indicating release of the policy control session to the destination PCRF.

In step 604 of the foregoing embodiment, if the policy control response indicates success of releasing the policy control session, a PCRF management message may be sent to the PCRF management entity, indicating success of releasing the policy control session. In step 605, after receiving information that indicates releasing the policy control session successfully, the PCRF management entity deletes the prestored mapping relation between the data connection and the PCRF that serves the data connection.

Figure 7:
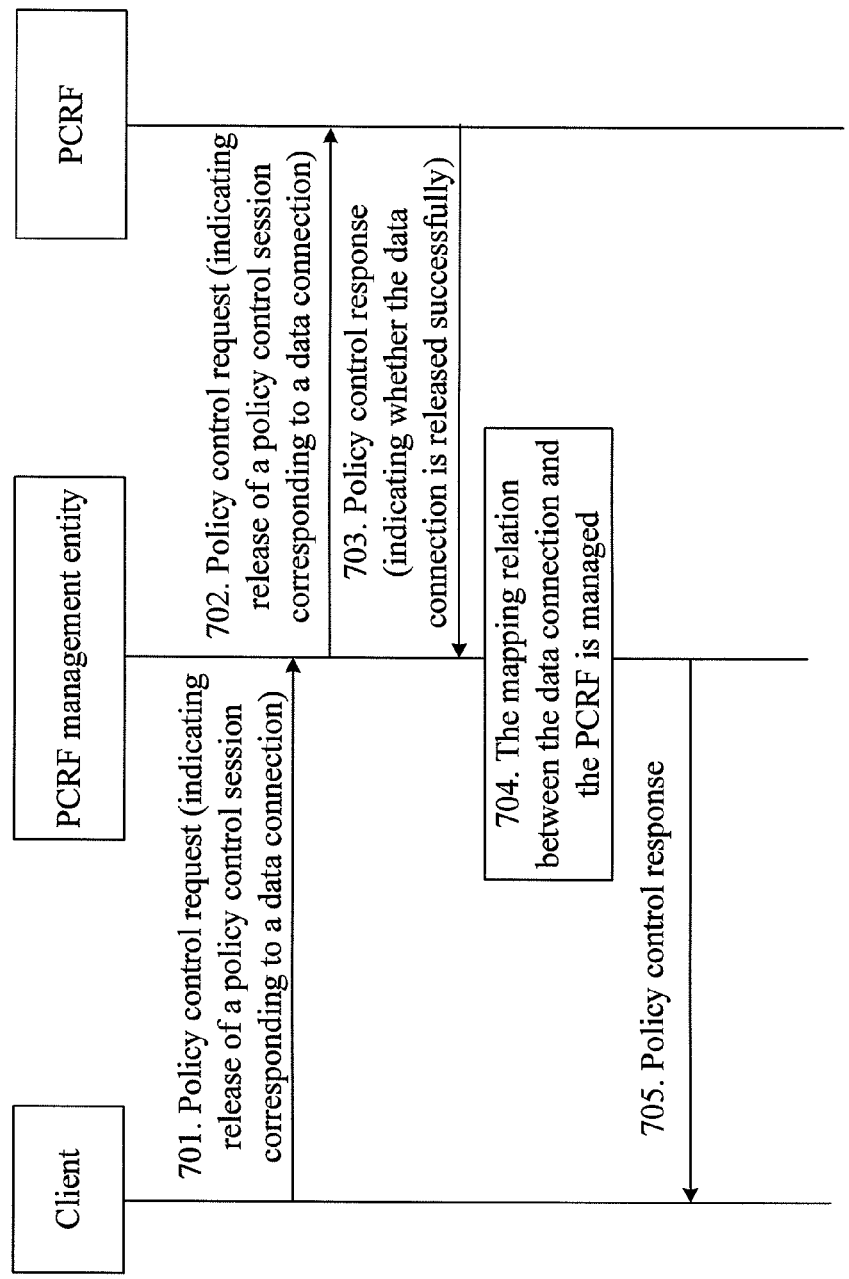
FIG. 7 is a flowchart of a PCRF management method in a sixth embodiment of the present disclosure.

FIG. 7 shows a PCRF management method provided in the sixth embodiment of the present disclosure. The method is applicable to deleting the policy control session corresponding to the data connection. The method includes:

Step 701: The client sends a policy control request indicating release of a policy control session corresponding to a data connection to the PCRF management entity.

Step 702: If the policy control request carries information about a destination PCRF, the PCRF management entity forwards the policy control request indicating release of the policy control session corresponding to the data connection to the destination PCRF.

Step 703: The destination PCRF sends a policy control response to the PCRF management entity, indicating whether the policy control session corresponding to the data connection is released successfully.

Step 704: If the PCRF management entity receives information that indicates success of releasing the policy control session, the PCRF management entity deletes the prestored mapping relation between the data connection and the PCRF that serves the data connection. If the PCRF management entity receives information that indicates failure of releasing the policy control session, the PCRF management entity keeps the prestored mapping relation between the data connection and the PCRF that serves the data connection.

Step 705: The PCRF management entity sends a policy control response to the client, indicating whether the policy control session is released successfully.

If the policy control response received by the PCRF management entity from the destination PCRF in step 703 indicates failure of releasing the policy control session, and the failure type is protocol failure, the PCRF management entity may reattempt to send the policy control request indicating release of the policy control session to the destination PCRF. If the final request fails, or the failure type is non-protocol failure, the PCRF management entity may keep the prestored mapping relation between the data connection and the PCRF that serves the data connection.

If the policy control request indicating release of the data connection in step 701 does not carry information about the destination PCRF, the PCRF management entity acquires the information about the destination PCRF according to the prestored mapping relation between the data connection and the PCRF that serves the data connection (the data connection exists between the user and the data network), and then in step 702, the PCRF management entity forwards the policy control request indicating release of the data connection to the destination PCRF.

Figure 8:
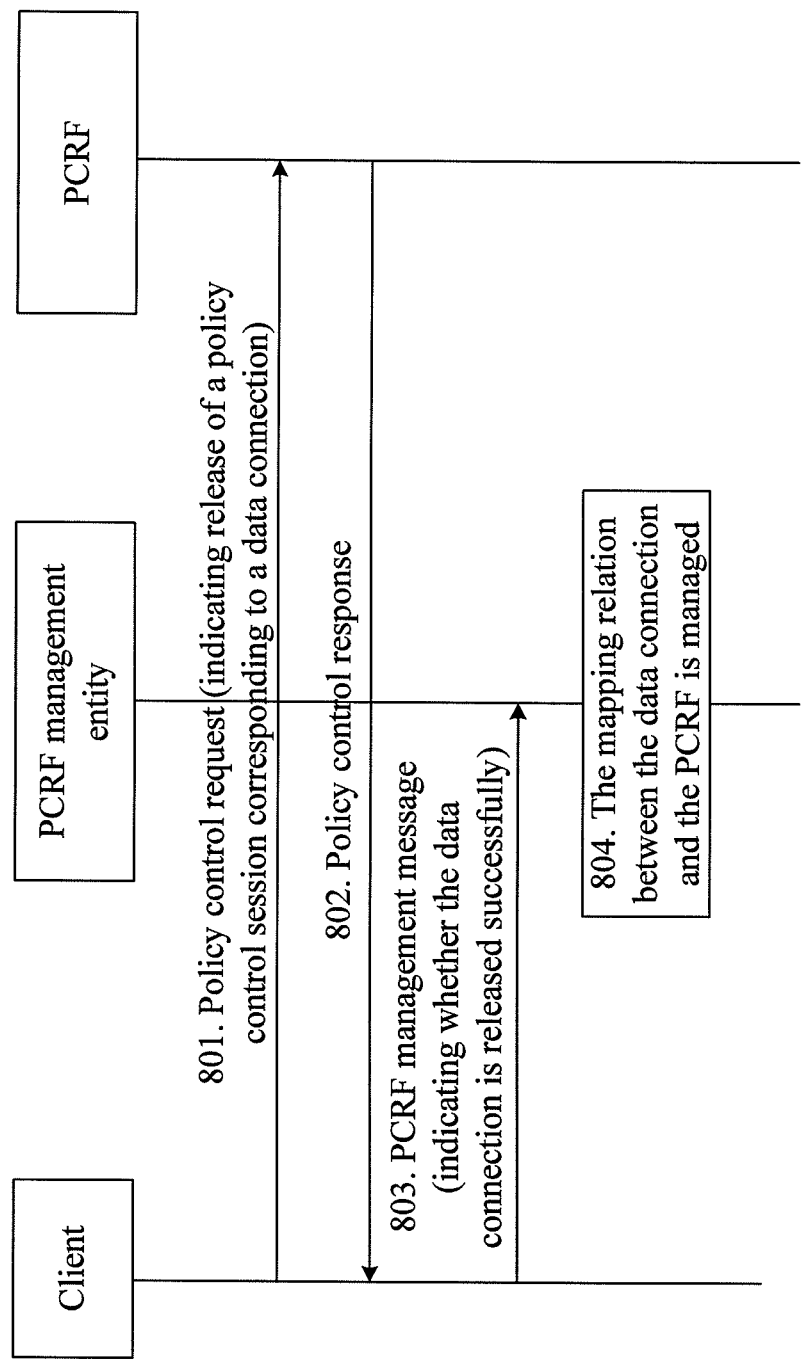
FIG. 8 is a flowchart of a PCRF management method in a seventh embodiment of the present disclosure.

FIG. 8 shows a PCRF management method provided in the seventh embodiment of the present disclosure. The method is applicable to deleting the policy control session corresponding to the data connection. The method includes:

Step 801: The client sends a policy control request indicating release of a policy control session corresponding to a data connection to the destination PCRF.

Step 802: The destination PCRF sends a policy control response to the client, indicating whether the policy control session is released successfully.

Step 803: The client sends a PCRF management message to the PCRF management entity, indicating whether the policy control session is released successfully.

Step 804: If the PCRF management entity receives information that indicates success of releasing the policy control session, the PCRF management entity deletes the prestored mapping relation between the data connection and the PCRF that serves the data connection. If the PCRF management entity receives information that indicates failure of releasing the policy control session, the PCRF management entity keeps the prestored mapping relation between the data connection and the PCRF that serves the data connection.

In step 803 of the foregoing embodiment, if the policy control response indicates success of releasing the policy control session, a PCRF management message may be sent to the PCRF management entity, indicating release of the policy control session. In step 804, after receiving information that indicates releasing the policy control session successfully, the PCRF management entity deletes the prestored mapping relation between the data connection and the PCRF that serves the data connection.

Figure 9:
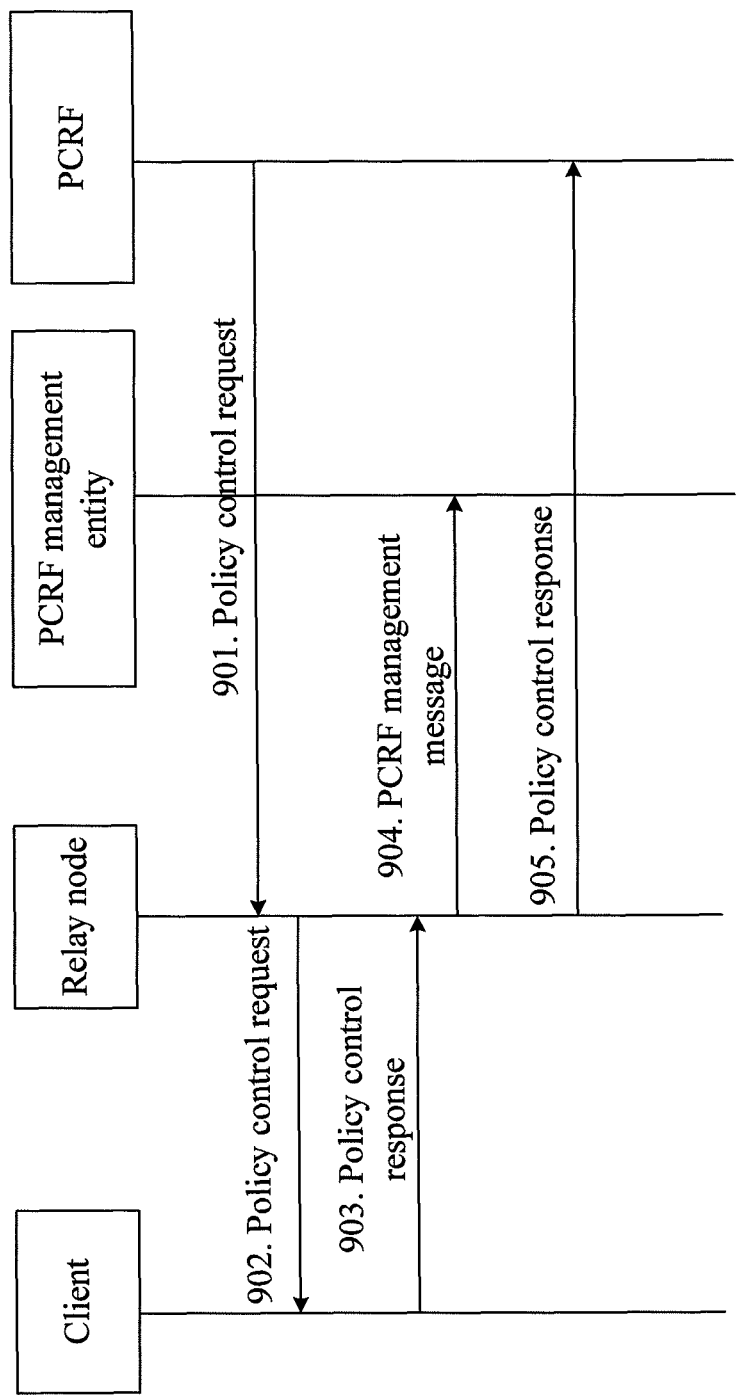
FIG. 9 is a flowchart of a PCRF management method in an eighth embodiment of the present disclosure.

FIG. 9 shows a PCRF management method provided in the eighth embodiment of the present disclosure. The method is applicable to deleting the policy control session corresponding to the data connection. The method includes:

Steps 901-902: The PCRF needs to delete a policy control session corresponding to a data connection, and sends a policy control request to the client through a relay node. The policy control request indicates deletion of the policy control session corresponding to the data connection. The relay node records the request.

Step 903: The client sends a policy control response to the relay node. The response indicates whether the policy control session corresponding to the data connection is deleted successfully.

If the client deletes the policy control session corresponding to the data connection successfully, the client sends a PCRF management message to the PCRF management entity. The message indicates that the policy control session is released successfully. In this case, step 904 may be omitted. If the client deletes the policy control session corresponding to the data connection unsuccessfully, step 904 needs to be executed.

Step 904: The relay node matches the policy control response and the policy control request. If the policy control response indicates failure of deleting the policy control information corresponding to the data connection, and the failure type is protocol failure, the relay node may reattempt to send the policy control request to the destination PCRF. If the final request fails, or the failure type is non-protocol failure, the PCRF management message sent by the relay node to the PCRF management entity carries information about failure of releasing the data connection. If the policy control response indicates success of deleting the policy control session corresponding to the data connection, the PCRF management message sent by the relay node to the PCRF management entity carries information about success of releasing the policy control session.

Step 905: The relay node sends a policy control response to the destination PCRF. The response indicates whether the policy control session corresponding to the data connection is deleted successfully.

Alternatively, in this embodiment, after the destination PCRF receives the policy control response indicating whether the policy control session corresponding to the data connection is deleted successfully, if the policy control response indicates success of deleting the policy control session corresponding to the data connection, the PCRF management message sent by the destination PCRF to the PCRF management entity carries information indicating success of releasing the policy control session.

Those skilled in the art are aware that all or part of the steps of the foregoing embodiments may be implemented by hardware instructed by a program. The program may be stored in a computer-readable storage medium such as a Read-Only Memory (ROM), a magnetic disk, or a compact disk.

Figure 10:
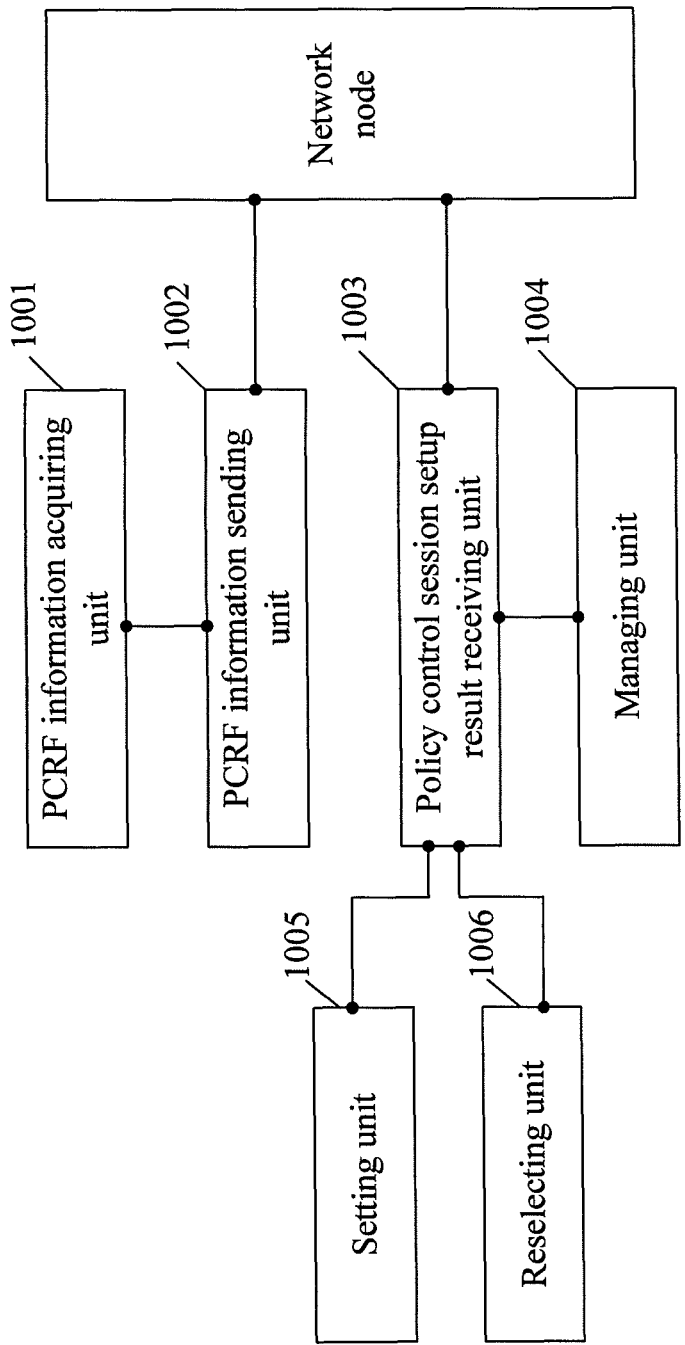
FIG. 10 shows a structure of a management network element in a ninth embodiment of the present disclosure.

As shown in FIG. 10, a management network element provided in the ninth embodiment of the present disclosure includes:

a PCRF information acquiring unit 1001, adapted to acquire information about PCRF entities available to a user;

a PCRF information sending unit 1002, adapted to send the acquired PCRF information to a network node that needs to set up a policy control session corresponding to a data connection;

a policy control session setup result receiving unit 1003, adapted to receive information about the result of setting up the policy control session corresponding to the data connection from the network node or the available PCRF, where the network node is a client or a relay node; and a managing unit 1004, adapted to manage a mapping relation between the data connection and the available PCRF according to the information about the result of setting up the policy control session corresponding to the data connection.

The managing unit 1004 includes a storing unit, which is adapted to: acquire the mapping relation between the data connection and the PCRF that sets up the policy control session successfully from the information about the result of setting up the policy control session, and store the mapping relation.

The PCRF information is the information about one PCRF; and the managing unit 1004 includes a deleting unit, which is adapted to delete the prestored mapping relation between the data connection and the PCRF if the information about the result of setting up the policy control session corresponding to the data connection indicates failure of setting up the policy control session with the PCRF.

The management network element further includes:

a setting unit 1005, adapted to set the PCRF that sets up the policy control session unsuccessfully as unavailable within a preset period; and a reselecting unit 1006, adapted to: if the information about the result of setting up the policy control session corresponding to the data connection carries an instruction of reselecting a PCRF, reacquire information about a PCRF available to the user and send the information to the network node, or send a request for setting up the policy control session corresponding to the data connection to the reacquired PCRF.

Figure 11:
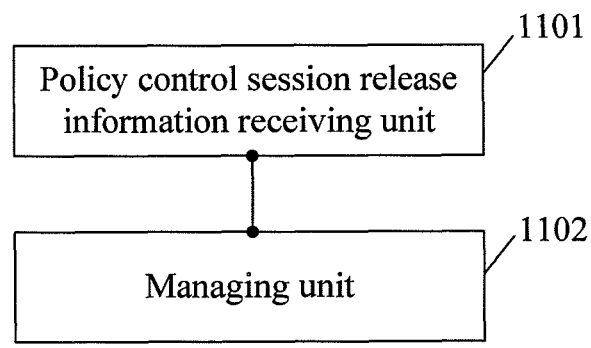
FIG. 11 shows a structure of a management network element in a tenth embodiment of the present disclosure.

As shown in FIG. 11, another management network element provided in the tenth embodiment of the present disclosure includes:

a policy control session release information receiving unit 1101, adapted to receive information about release of a policy control session corresponding to a data connection; and a managing unit 1102, adapted to manage the prestored mapping relation between the data connection and the PCRF that serves the data connection according to the received information about release of the policy control session corresponding to the data connection.

The managing unit 1102 is adapted to delete the prestored mapping relation between the data connection and the PCRF that serves the data connection if the information about release of the policy control session corresponding to the data connection indicates success of releasing the policy control session.

Figure 12:
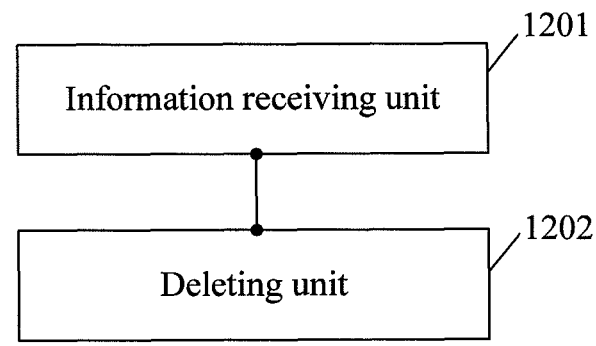
FIG. 12 shows a structure of a management network element in an eleventh embodiment of the present disclosure.

As shown in FIG. 12, another management network element provided in the eleventh embodiment of the present disclosure includes:

an information receiving unit 1201, adapted to receive information that indicates failure of setting up a policy control session corresponding to a data connection between a user and a PCRF that serves the data connection; and a deleting unit 1202, adapted to delete the prestored mapping relation between the data connection and the PCRF that serves the data connection.

A network system provided in the twelfth embodiment of the present disclosure includes:

a network node, adapted to: check whether a policy control session corresponding to a data connection is released successfully, and send information about release of the policy control session corresponding to the data connection to a management network element; and the management network element, adapted to: receive the information about release of the policy control session corresponding to the data connection from the network node, and manage a prestored mapping relation between the data connection and a PCRF that serves the data connection according to the received information about release of the policy control session corresponding to the data connection.

The network node is a relay node, a client, or a PCRF that serves the data connection.

A network system provided in the twelfth embodiment of the present disclosure includes:

a management network element, adapted to acquire information about a PCRF available to a user, and send the information to a network node that needs to set up a policy control session corresponding to a data connection, receive information about a result of setting up the policy control session corresponding to the data connection from the network node, and manage a mapping relation between the data connection and the available PCRF according to the information about the result of setting up the policy control session corresponding to the data connection; and the network node, adapted to send a request for setting up the policy control session corresponding to the data connection to the available PCRF, receive a response from the available PCRF indicating whether the policy control session corresponding to the data connection is set up successfully, and send the information about the result of setting up the policy control session corresponding to the data connection to the management network element according to the response.

A network system provided in the thirteenth embodiment of the present disclosure includes:

a management network element, adapted to acquire information about a PCRF available to a user and send the information to a network node that needs to set up a policy control session corresponding to a data connection, receive information about a result of setting up the policy control session corresponding to the data connection from the available PCRF, and manage a mapping relation between the data connection and the available PCRF according to the information about the result of setting up the policy control session corresponding to the data connection;

the network node, adapted to send a request for setting up the policy control session corresponding to the data connection to the available PCRF; and the available PCRF, adapted to check whether the policy control session corresponding to the data connection is set up successfully after receiving the request, and send the information about the result of setting up the policy control session corresponding to the data connection to the management network element.

In conclusion, the embodiments of the present disclosure bring the following benefits:

1. At the time of releasing the data connection between the user and the data network, the PCRF management entity can acquire information about whether the policy control session corresponding to the data connection is released successfully, and manage the mapping relation between the data connection and the PCRF that serves the data connection according to the acquired information about whether the policy control session corresponding to the data connection is released successfully. Therefore, if the data connection is released successfully, the PCRF management entity no longer stores the mapping relation between the data connection and the PCRF that serves the data connection.

2. When the user sets up the data connection for the first time, the PCRF management entity sets up the mapping relation between the data connection and the PCRF only after receiving the information that indicates whether the policy control session corresponding to the data connection is set up successfully, thus ensuring the PCRF management entity to store the correct mapping relation between the data connection and the PCRF.

3. After information is received which indicates failure of setting up the policy control session corresponding to the data connection with the PCRF that serves the data connection, the prestored mapping relation between the data connection and the PCRF that serves the data connection is deleted. Therefore, the management network element no longer stores the mapping relation. When receiving the next policy control request for setting up the data connection, the management network element does not send the information about the PCRF which involves the failure of setting up the policy control session to the client; otherwise, it is impossible to set up the policy control session corresponding to the data connection.

Detailed above are a PCRF management method, a management network element, and a network system under the present disclosure. Although the disclosure is described through several exemplary embodiments, the disclosure is not limited to such embodiments.

What is claimed is:

1. A Policy and Charging Rules Function (PCRF) management method, the method comprising:
   acquiring, by a PCRF management entity, information about a policy control session corresponding to a data connection, wherein the information about the policy control session comprises information regarding failure of setting up the policy control session corresponding to the data connection; and
   deleting, by the PCRF management entity, a prestored mapping relation between the data connection and a PCRF that serves the data connection according to the information about the policy control session corresponding to the data connection.

2. The method of claim 1, the method further comprising:
   reacquiring, by the PCRF management entity, information about PCRF available to a user in response to the failure of setting up the policy control session with the PCRF; and
   sending, by the PCRF management entity, a redirection instruction which carries information about a reacquired PCRF to a network node.

3. The method of claim 2, wherein the network node is a client or a relay node.

4. The method of claim 2, the method further comprising:
   setting, by the PCRF management entity, up a mapping relation between the data connection and the reacquired PCRF.

5. The method of claim 1, wherein acquiring, by the PCRF management entity, information about a policy control session corresponding to a data connection comprises:
   receiving, by the PCRF management entity, information about failure of setting up the policy control session corresponding to the data connection from a network node or the PCRF.

6. The method of claim 5, wherein the network node is a client or a relay node.

7. A non-transitory computer readable storage medium encoded with computer program stored thereon causing a processor to perform acts comprising:
   acquiring information about a policy control session corresponding to a data connection, wherein the information about the policy control session comprises information regarding failure of setting up the policy control session corresponding to the data connection; and
   deleting a prestored mapping relation between the data connection and a PCRF that serves the data connection according to the information about the policy control session corresponding to the data connection.

8. The non-transitory computer readable storage medium of claim 7, the acts further comprising:
   reacquiring information about PCRF available to a user in response to the failure of setting up the policy control session with the PCRF; and
   sending a redirection instruction which carries information about a reacquired PCRF to a network node.

9. The non-transitory computer readable storage medium of claim 8, the acts further comprising:
   setting up a mapping relation between the data connection and the reacquired PCRF.

10. The non-transitory computer readable storage medium of claim 7, wherein acquiring information about a policy control session corresponding to a data connection comprises:
   receiving information about failure of setting up the policy control session corresponding to the data connection from a network node or the PCRF.

11. A server device, comprising a hardware processor and a non-transitory storage medium accessible to the processor, the server device is configured to:
- acquire information about a policy control session corresponding to a data connection, wherein the information about the policy control session comprises information regarding failure of setting up the policy control session corresponding to the data connection; and
- delete a prestored mapping relation between the data connection and a PCRF that serves the data connection according to the information about the policy control session corresponding to the data connection.

12. The server device of claim 11, further configured to:
- reacquire information about PCRF available to a user in response to the failure of setting up the policy control session with the PCRF; and
- send a redirection instruction which carries information about a reacquired PCRF to a network node.

13. The server device of claim 12, further configured to:
- set up a mapping relation between the data connection and the reacquired PCRF.

14. The server device of claim 11, further configured to:
- receive information about failure of setting up the policy control session corresponding to the data connection from a network node or the PCRF.

* * * * *